Feb. 23, 1954 — H. J. DE VOGT — 2,669,957
WELDING CLAMP

Filed July 6, 1950 — 2 Sheets-Sheet 1

INVENTOR
HANS JOACHIM DE VOGT
BY
Bailey, Stephens & Huettig
ATTORNEYS

Feb. 23, 1954 H. J. DE VOGT 2,669,957
WELDING CLAMP
Filed July 6, 1950 2 Sheets-Sheet 2

INVENTOR
HANS JOACHIM DE VOGT
BY
Bailey, Stephens & Huettig
ATTORNEYS

UNITED STATES PATENT OFFICE 2,669,957

WELDING CLAMP

Hans Joachim de Vogt, Solingen-Ohligs, Germany

Application July 6, 1950, Serial No. 172,349

1 Claim. (Cl. 113—99)

The present invention relates to an improved clamp for use in welding together metal parts such as plates, rods, tubes and the like, in a predetermined angular relation, particularly at right angles to each other.

Previously designed clamps of this type have been of complicated construction and furthermore were in many instances of limited application with regard to the type of welded joints which could be obtained with the aid thereof.

It is an object of the invention to provide a simple and easily operable clamp for holding metal parts which are to be welded together at a predetermined angle with respect to each other.

It is a further object of the invention to provide a clamping device wherein the joints between the metal parts held therein are easily accessible for welding.

The clamping device in accordance with the invention generally comprises a base plate carrying at its forward end a pair of vertical upright spaced flanges which are angularly disposed with respect to each other and a member having spaced clamping surfaces mounted on the rearward end of such base plate for movement toward and away from the flanges for holding the metal objects to be welded. The flanges on the base are so arranged that the base member does not extend beyond the forward converging ends of the flanges and the member carrying the co-operating clamping surfaces is so constructed that it also does not extend beyond the forward ends of such surfaces so as to provide ample space for welding the joint between the metal parts held in the clamping device.

The accompanying drawings show by way of example two modifications of a clamping device in accordance with the invention in which.

Figure 2:
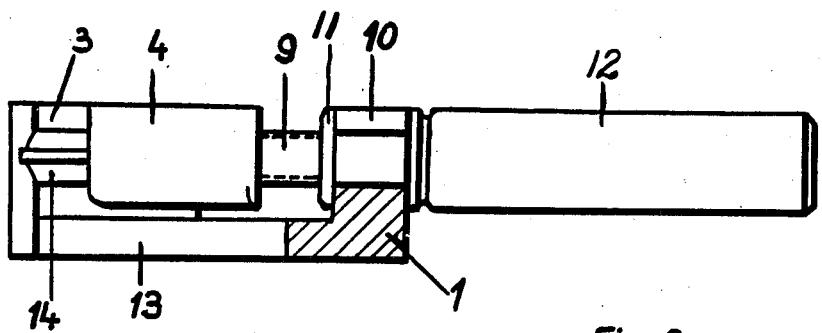
Figure 2 shows a side view partly in section of such modification.
Figure 1:
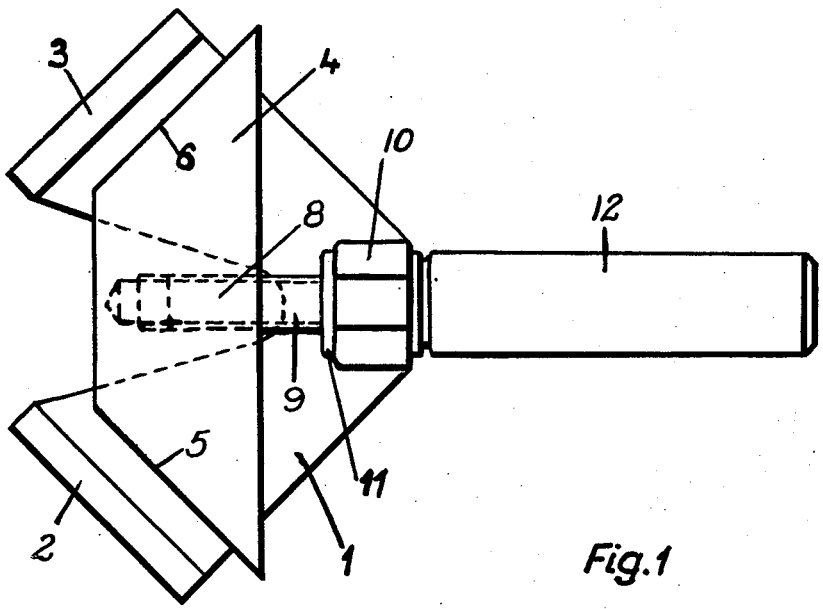
Figure 1 shows a top plan view of one modification.

In the modification shown in Figures 1 and 2, the base plate 1 is provided with vertical spaced flanges 2 and 3 in right angle relationship at its forward end. Clamping member 4 which is spaced slightly from the base plate 1 is in the form of a right triangle having its apex blunted so as to provide spaced clamping surfaces 5 and 6 cooperating with flanges 2 and 3. The rear side of clamping member 4 is provided with a threaded bore 8 which does not completely extend through to the blunted forward end and is threaded upon bolt 9 which is rotatably mounted in boss 10 on the back end of base plate 1. Bolt 9 is provided with a collar 11 to prevent its longitudinal movement through the boss. Handle 12 is provided upon the end of the bolt extending through the boss to facilitate rotation thereof. The lower edges of the clamping surfaces 6 and 7 are preferably rounded as shown in the drawings so as to be certain that the clamping member will closely fit the interior surfaces of angular metal parts to be clamped. The blunted edge of clamping member is of substantially the same length as the distance between the forward ends of the spaced flanges 2 and 3 so that even in closed position such clamping member does not extend beyond the forward ends of the flanges so as to provide ample space for welding the seams of the parts to be welded. Preferably as shown in the drawings the base plate 1 is provided with a slot 13 which extends rearwardly from the forward ends of the flanges in the direction of the bisector of the angle between the flanges. This slot facilitates the welding of seams which are horizontal with respect to the base plate 1.

The operation of the device is very simple and is easily understood from the form thereof. First the device is opened by turning handle 12 until clamping member 4 is sufficiently retracted to permit insertion of the parts to be welded between its clamping surfaces 5 and 6 and the perpendicular flanges 2 and 3. The handle is then turned in the opposite direction until the parts to be welded are firmly clamped in the desired welding relationship by flanges 2 and 3 and clamping surfaces 5 and 6. It is to be noted that the movement of clamping member upon rotation of the handle is in the direction of the bisector of the angle between flanges 2 and 3.

The space provided between the clamping member 5 and base plate 1 and the slot provided in the base plate renders it possible to weld together angular or U-shaped stock in a very simple manner.

The bore 8 preferably is closed at its forward end to prevent damage to the threads therein by flying bits of molten metal during the welding operation.

Figure 4:
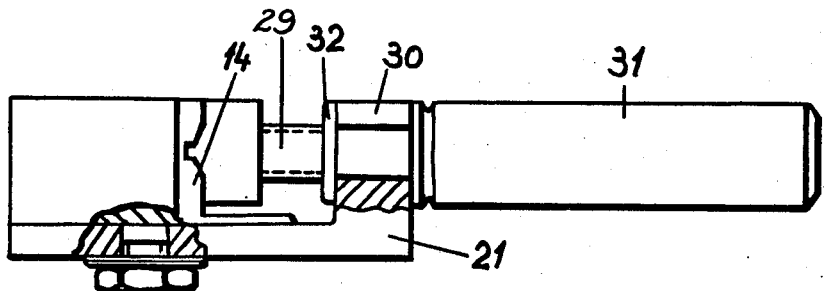
Figure 4 shows a side view partly in section of such second modification.
Figure 3:
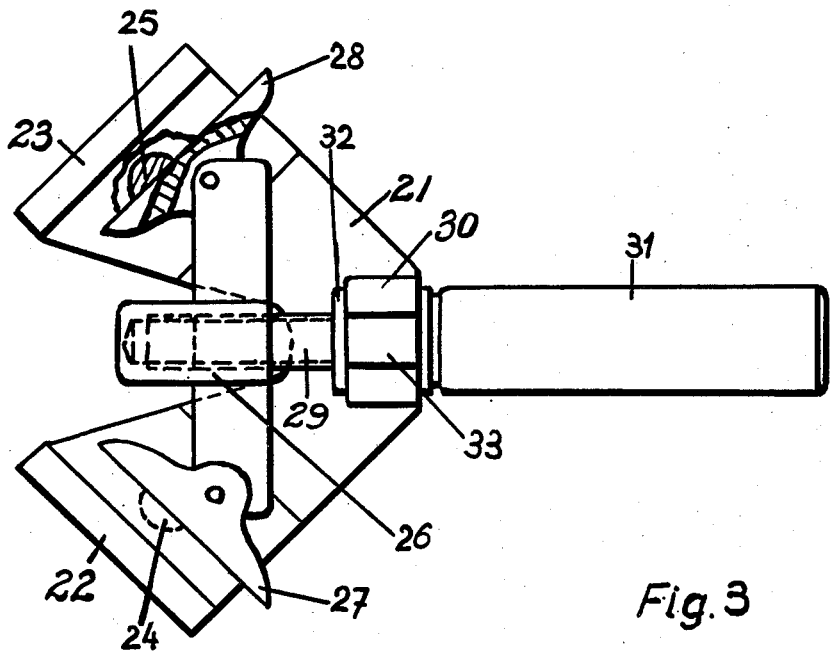
Figure 3 shows a top plan view of the second modification partly in section.

Another modification of the device in accordance with the invention is shown in Figures 3 and 4 in which the base plate 21 is provided at its forward end with adjustable vertical flanges 22 and 23 whose angular relationships may be altered by means of bolts 24 and 25. Clamping member 26, which is provided with swivelled clamping jaws 27 and 28, is threaded on bolt 29 which is mounted on boss 30 on the rearward end of plate 21. Handle 31 is provided on the end of the bolt to facilitate its rotation and a collar 32 is provided on the bolt to prevent its longitudinal movement through boss 30. The upper side of boss 30 is provided with a slot 33 to permit disassembly of the clamping member, and its associated bolt and handle from the base plate, and thereby facilitate removal of the clamp after the welding operation has been completed on parts which surround the clamping member.

The operation of this modification of the device is similar to that of that shown in Figures 1 and 2 but swivelled clamping jaws 27 and 28 will adjust themselves automatically to whatever angle the flanges 22 and 23 have been set at.

It has been found preferable to provide a horizontal groove in at least one of the working surfaces of the clamping device in accordance with the invention, that is, the interior surfaces of the flanges or the cooperating surfaces on the clamping member in order to facilitate alignment of, for example, a round stock. Such a groove is preferably of triangular cross-section as is the groove 14 shown in the drawings.

I claim:

A welding vise comprising a base, a pair of arms diverging from said base in a forward direction and substantially at right angles to one another with a substantial space therebetween, a vertical flange secured to the forward end of each of said arms, said flanges being angularly disposed with respect to but spaced from each other and converging in a forward direction to provide a pair of rearwardly directed clamping surfaces, a threaded bolt, an open-slotted boss on the rearward portion of said base for mounting said bolt for rotation about its longitudinal axis, said bolt extending forwardly in a direction substantially bisecting the angle between said arms and having its forward end overlying said space, handle means for rotating said bolt, enlargements on said bolt on either side of the boss for holding the bolt against longitudinal movement while being turned, a clamping member having an internally threaded bore therein, said bore being closed at its forward end, said bolt being threadedly engaged in said bore to move said clamping member in the direction of the longitudinal axis of said bolt and parallel with said base, said clamping member being in the shape of a truncated triangle whose spaced truncated converging sides form a pair of spaced forwardly disposed vertical clamping surfaces cooperating in a substantially parallel relationship with the rearwardly directed clamping surfaces of said flanges.

HANS JOACHIM DE VOGT.

References Cited in the file of this patent

UNITED STATES PATENTS

| Number | Name | Date |
|---|---|---|
| 824,264 | Runner | June 26, 1906 |
| 904,234 | Sievert | Nov. 17, 1908 |
| 936,368 | Schrock | Oct. 12, 1909 |
| 1,060,477 | Meyers | Apr. 29, 1913 |
| 1,407,188 | Cormack | Feb. 21, 1922 |
| 1,577,868 | Muller | Mar. 23, 1926 |
| 1,781,419 | Wallace | Nov. 11, 1930 |
| 2,257,122 | O'Connor | Sept. 30, 1941 |
| 2,498,725 | Thornburg | Feb. 28, 1950 |

FOREIGN PATENTS

| Number | Country | Date |
|---|---|---|
| 267,097 | Germany | Oct. 16, 1913 |

OTHER REFERENCES

Amer. Mach. June 7, 1945, p. 117.